(12) United States Patent
Partyka

(10) Patent No.: US 7,815,119 B2
(45) Date of Patent: Oct. 19, 2010

(54) MONITORING SCAN MIRROR MOTION IN LASER SCANNING ARRANGEMENTS

(75) Inventor: Andrzej Partyka, Bedminster, NJ (US)

(73) Assignee: Symbol Technologies, Inc., Holtsville, NY (US)

( * ) Notice: Subject to any disclaimer, the term of this patent is extended or adjusted under 35 U.S.C. 154(b) by 523 days.

(21) Appl. No.: 11/796,151

(22) Filed: Apr. 26, 2007

(65) Prior Publication Data

US 2007/0278311 A1 Dec. 6, 2007

Related U.S. Application Data

(60) Provisional application No. 60/811,215, filed on Jun. 6, 2006.

(51) Int. Cl.
G02B 5/06 (2006.01)
G02B 26/00 (2006.01)
G06K 7/10 (2006.01)

(52) U.S. Cl. .................................. 235/462.36
(58) Field of Classification Search .............. 235/426.36
See application file for complete search history.

(56) References Cited

U.S. PATENT DOCUMENTS

| | | | | |
|---|---|---|---|---|
| 4,160,913 A | * | 7/1979 | Brenholdt | 250/559.49 |
| 5,691,739 A | * | 11/1997 | Kawamori et al. | 345/58 |
| 6,691,919 B1 | * | 2/2004 | Katz et al. | 235/462.01 |
| 7,126,734 B1 | * | 10/2006 | Giebel et al. | 359/199.3 |
| 7,130,095 B1 | * | 10/2006 | Wood | 359/201.1 |
| 2006/0289653 A1 | * | 12/2006 | Wittenberg et al. | 235/462.37 |
| 2006/0290774 A1 | * | 12/2006 | Wittenberg et al. | 347/243 |
| 2007/0181688 A1 | * | 8/2007 | Li et al. | 235/462.2 |
| 2008/0320426 A1 | * | 12/2008 | Chang | 716/6 |

* cited by examiner

*Primary Examiner*—Daniel A Hess
*Assistant Examiner*—David Tardif
(74) *Attorney, Agent, or Firm*—Kirschstein, et al.

(57) ABSTRACT

Contamination in a feedback signal is eliminated in a laser scanning arrangement having a drive coil driven by a drive signal formed as a periodic train of drive pulses to oscillate a scan mirror and a light beam reflected from the scan mirror. A feedback coil generates a feedback signal during oscillation of the scan mirror, the feedback coil being in proximity with the drive coil and being subject to corruption by cross-coupling between the coils. The drive coil is not driven with at least one drive pulse during a quiet time period. Cross-coupling is eliminated by generating the feedback signal only during the quiet time period, and by monitoring a position of the scan mirror by processing the feedback signal which was generated only during the quiet time period.

46 Claims, 8 Drawing Sheets

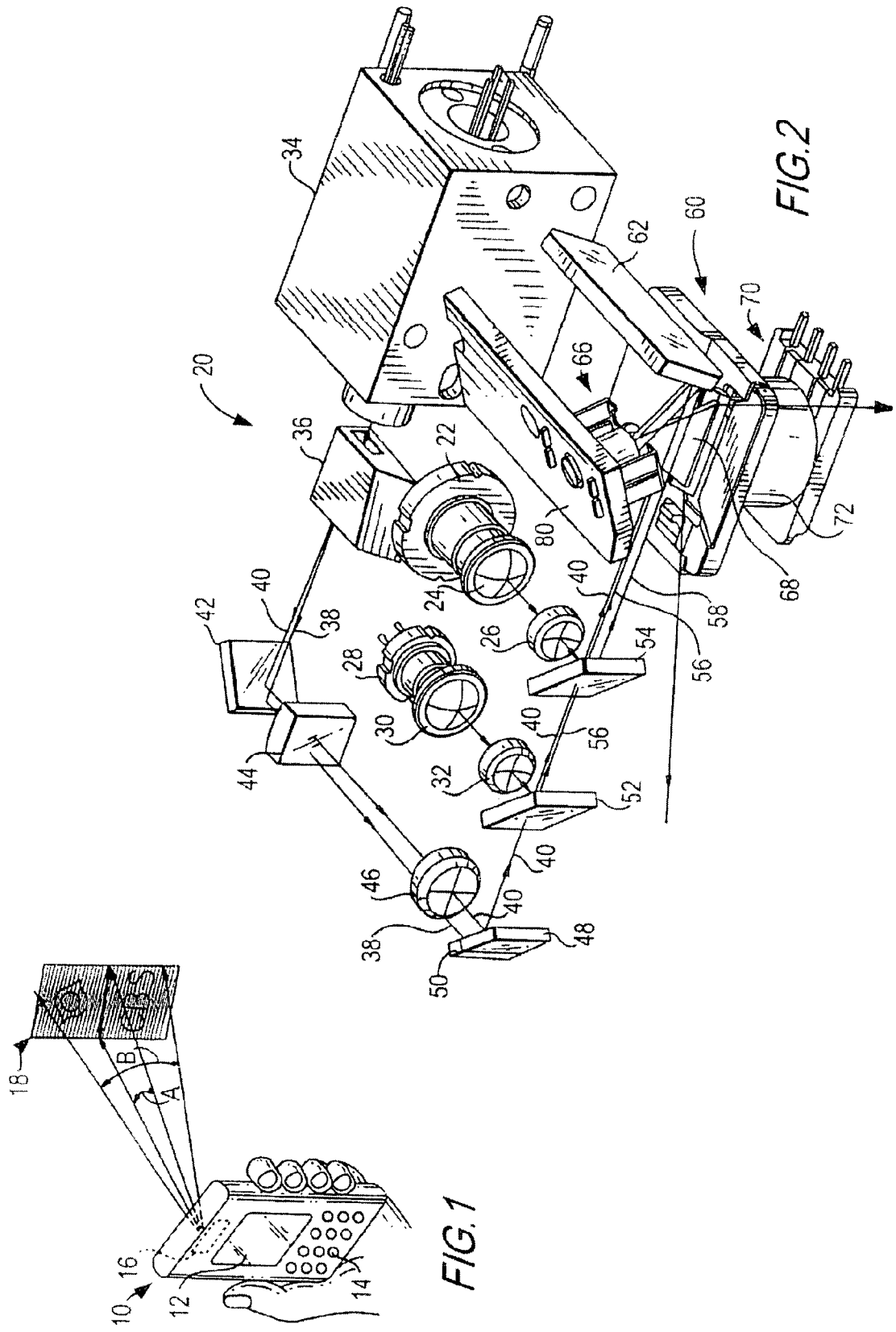

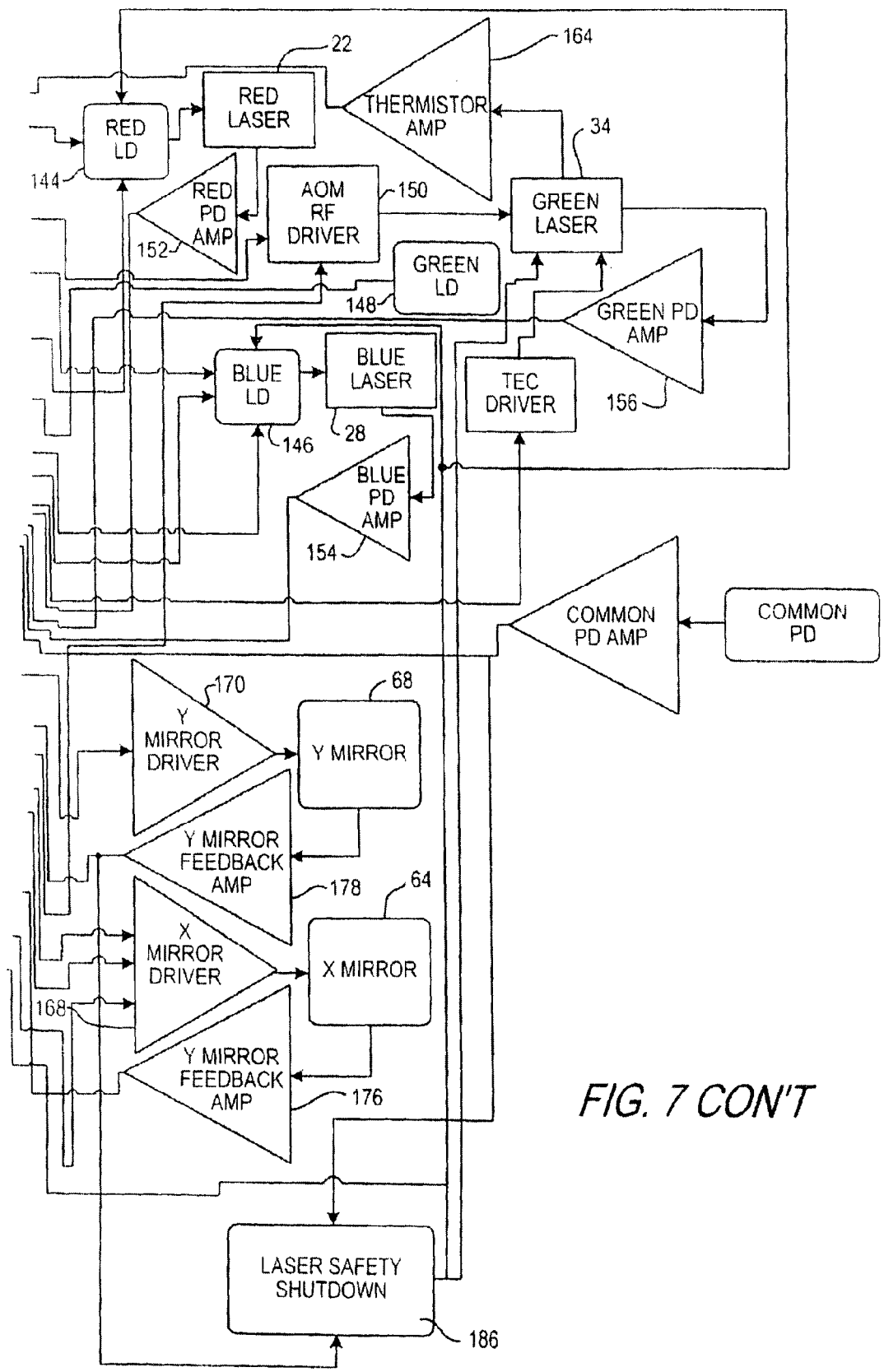
FIG. 7 CON'T

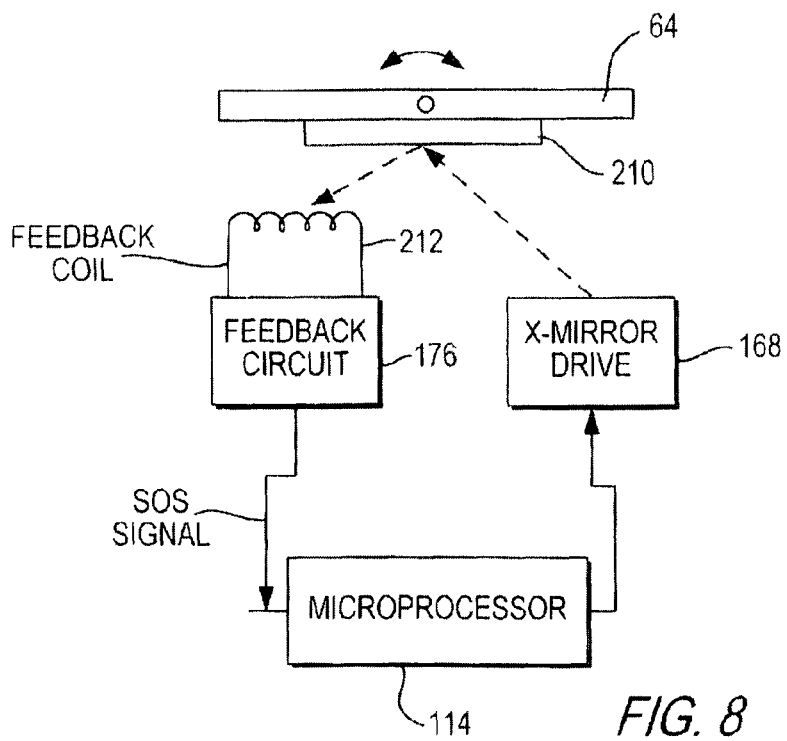
FIG. 8
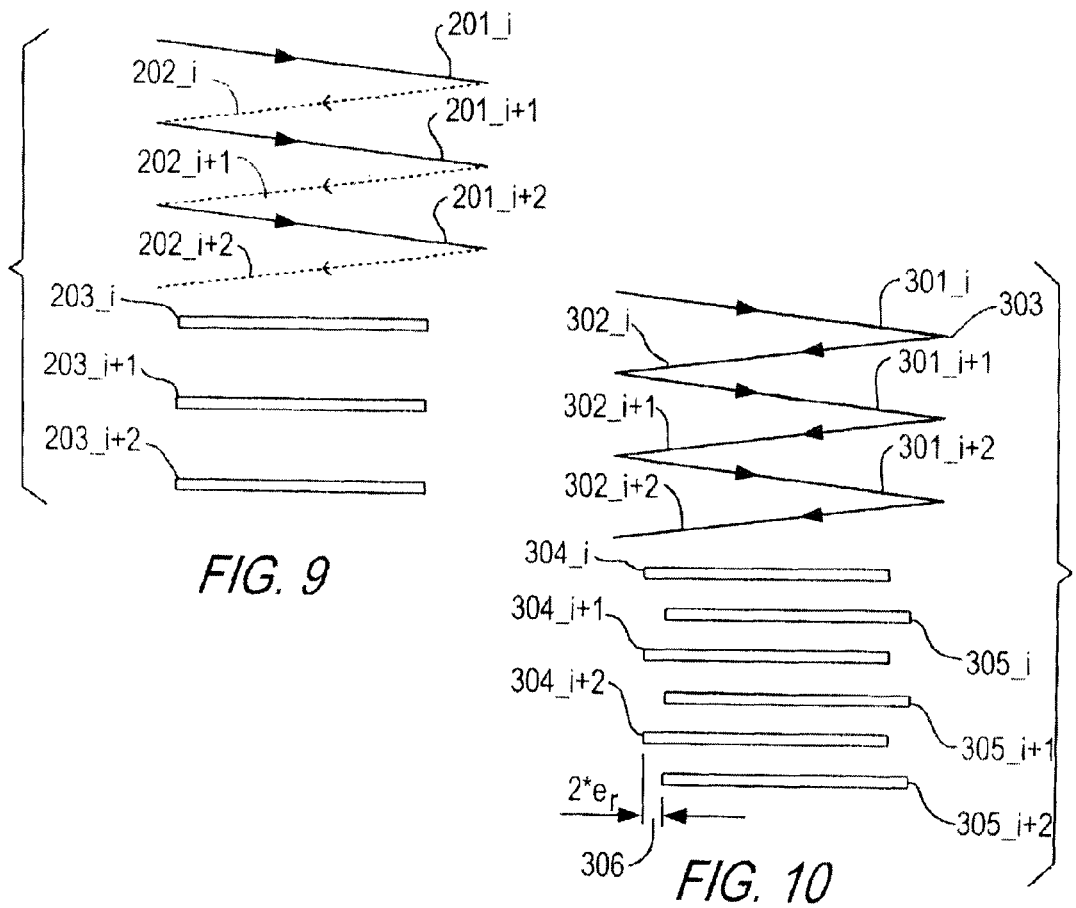
FIG. 9
FIG. 10

MONITORING SCAN MIRROR MOTION IN LASER SCANNING ARRANGEMENTS

CROSS REFERENCE TO THE RELATED APPLICATION

This application claims the priority of U.S. Provisional Patent Application Ser. No. 60/811,215, filed Jun. 6, 2006.

BACKGROUND OF THE INVENTION

1. Field of the Invention

The present invention generally relates to monitoring the motion of a scan mirror employed for sweeping a light beam in laser scanning arrangements, such as image projectors for displaying images or electro-optical readers for reading indicia and, more particularly, to reducing contamination in a feedback signal indicative of such mirror motion.

2. Description of the Related Art

It is generally known to project a two-dimensional image on a projection surface based on a pair of scan mirrors which oscillate in mutually orthogonal directions to scan a laser beam over a raster pattern comprised of a plurality of scan lines. The image is created in the raster pattern by energizing or pulsing a laser on and off at selected times, thereby illuminating selected pixels with a beam spot and not illuminating other pixels in each scan line.

One of the scan mirrors, sometimes referred to herein as an X-mirror, sweeps the laser beam at a relatively faster speed generally along a scan direction extending along the horizontal, and the other of the scan mirrors, sometimes referred to herein as a Y-mirror, sweeps the scan line at a relatively slower speed generally perpendicular to the scan direction extending along the vertical. The X-mirror is oscillated, typically at resonance, at a scan frequency and at a speed that varies along each scan line, and the Y-mirror is driven at a constant speed during a forward scan from an upper to a lower portion of the raster pattern (or vice versa) and is either driven or allowed to self-return during a return scan from the lower to the upper portion of the raster pattern (or vice versa).

The repetitive sweeping of the light beam is performed by a pair of drives, one for each scan mirror. The drives may be the same or different. Typically, one of the drives includes a permanent magnet mounted on a scan mirror for joint oscillation. A feedback coil is positioned adjacent the magnet. In response to a periodic drive signal applied by the drive, the magnet and the mirror are oscillated. A feedback signal is generated by the feedback coil during oscillation. The frequency of the feedback signal is the same as the mirror motion, with one cycle of the feedback signal corresponding to one cycle of mirror motion. The amplitude of the feedback signal is proportional to the velocity of the mirror motion. The polarity of the feedback signal is dependent on the direction of mirror motion such that a positive half cycle of the feedback signal indicates that the mirror is moving in one drive direction, and a negative half cycle indicates that the mirror is moving in the opposite drive direction. Zero crossings of the feedback signal occur when the mirror reaches its maximum travel at each end of a respective scan line. At each zero crossing, the mirror stops for an instant and reverses drive direction.

The feedback signal is useful for various purposes. For example, an electrical drive monitoring circuit is often employed to monitor the amplitude of the feedback signal and, for example, turn the laser beam off if the amplitude falls below a predetermined threshold, thereby indicating that the drive is malfunctioning. An electrical closed loop control circuit is also often employed to process the feedback signal to make decisions about whether to continue energizing the drive. Still another electronic circuit that is often employed processes the zero crossings of the feedback signal to derive a start-of-scan (SOS) signal that represents mirror motion and is used to synchronize the scan lines.

Electro-optical readers are also well known in the art for electro-optically transforming a spatial pattern of graphic indicia, known as a symbol, into a time-varying electrical signal which is then decoded into data. Typically, a light beam generated from a light source is focused by a lens along an optical path toward a target that includes the symbol. The light beam is repetitively swept along a scan line or a series of scan lines arranged in a raster pattern over the symbol by moving one or more scan mirrors located in the optical path. A photodetector detects light scattered or reflected from the symbol and generates an analog electrical signal. Electronic circuitry converts the analog signal into a digitized signal having pulse widths corresponding to physical widths of bars and spaces comprising the symbol, and a decoder decodes the digitized signal into data descriptive of the symbol.

The repetitive sweeping of the light beam in readers is performed by a drive, typically a motor having a rotor oscillatable about an axis. A permanent magnet and the scan mirror are jointly oscillatable with the rotor. The motor is driven by a drive coil wound on a bobbin that is located physically close to the permanent magnet. A feedback coil is also wound on the same bobbin. In response to an alternating voltage drive signal applied to the drive coil, the electromagnetic field produced by the drive coil interacts with the permanent magnetic field of the magnet, thereby jointly moving the magnet and the mirror.

Although generally satisfactory for its intended purpose, the feedback signal in image projectors and electro-optical readers can be contaminated by the periodic drive signal voltage, as well as by the switching electronics for producing the periodic drive signal voltage. The periodic drive signal voltage couples to the feedback coil and adds to the voltage of the feedback signal. Since the contaminants are synchronous with the feedback signal, it is not readily possible to remove the contaminants by signal processing. Hence, the position of the mirror cannot be precisely located. Such contamination is a problem in electro-optical readers and is a severe problem in image projectors, because the motion or velocity of the scan mirror and, hence, of each scan line swept by the scan mirror must be very highly controlled to be a constant value for both right-to-left and left-to-right scan lines. Otherwise, the projected image will be degraded.

FEATURES OF THE INVENTION

One feature of the present invention resides, briefly stated, in an arrangement for, and a method of, monitoring motion of a scan mirror used for sweeping a light beam by generating a feedback signal indicative of such motion and uncontaminated by a periodic drive voltage.

The arrangement and method may be employed in an electro-optical reader in which case the light beam is swept as one or more scan lines across a symbol, preferably a one- or two-dimensional symbol. The arrangement and method could also be used in an image projector in which case the light beam is swept in a raster pattern of scan lines across a screen on which an image is viewable.

In either case, the light beam is moved by an electrical drive having a rotor on which the scan mirror is mounted for oscillating movement. Preferably, a permanent magnet having a permanent magnetic field is mounted on the mirror for joint movement therewith. A periodic drive signal is applied to a drive coil which generates an electromagnetic field that interacts with the permanent field to oscillate the magnet and the mirror in opposite drive directions to generate a raster pattern of scan lines which extend in mutually orthogonal scan directions over a target. In the case of the reader, a portion of the light derived from the scan lines and scattered by the symbol is processed to read the symbol. In the case of the projector, the light source is energized and deenergized during travel of the beam along each scan line to create the image on the target screen.

A feedback coil is located in proximity with the magnet for generating the feedback signal indicative of joint motion of the mirror and the magnet. However, the feedback coil is also in close proximity with the periodic drive signal and the electronic circuitry that generates the same. The feedback signal thus becomes contaminated by the periodic drive signal.

In accordance with another feature of this invention, a system and method are described for reducing, if not eliminating, the contaminating effect of the periodic drive signal on the feedback signal. The contamination-reduced feedback signal is a more accurate representation of mirror position and of velocity and, hence, of beam position. Performance of the image projector and the reader is enhanced.

The drive is operative for driving the drive coil with a drive signal formed as a periodic train of drive pulses, and for not driving the drive coil with at least one drive pulse, and preferably a plurality of drive pulses, during a quiet time period. The system includes circuitry for minimizing the cross-coupling by generating the feedback signal only during the quiet time period. A controller monitors a position of the scan mirror by processing the feedback signal which was generated only during the quiet time period. Preferably, the controller processes the feedback signal by measuring the position of the scan mirror during the quiet time period.

Preferably, the feedback signal has a feedback frequency corresponding to a drive frequency of the drive signal. The drive may oscillate the scan mirror in only one circumferential direction, or in both opposite circumferential directions.

Advantageously, circuitry is provided for compensating for the absence of the at least one drive pulse in the quiet time period by generating at least one compensating pulse during a compensation time period following the quiet time period. The at least one compensating pulse has a greater pulse width than that of each drive pulse.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a hand-held instrument projecting an image at a working distance therefrom;

FIG. 2 is an enlarged, overhead, perspective view of an image projection arrangement for installation in the instrument of FIG. 1;

FIG. 8 is an electrical schematic block diagram depicting an X-mirror drive circuit used in the arrangement of FIG. 6;

FIG. 9 is a diagrammatic view depicting a raster pattern when the X-mirror is driven in one direction, as well as the resulting light pattern when the laser beam is turned on for only one direction;

FIG. 10 is a diagrammatic view depicting a raster pattern when the X-mirror is driven in two directions, as well as the resulting light pattern when the laser beam is turned on for both directions;

DETAILED DESCRIPTION OF THE PREFERRED EMBODIMENTS

Figure 3:
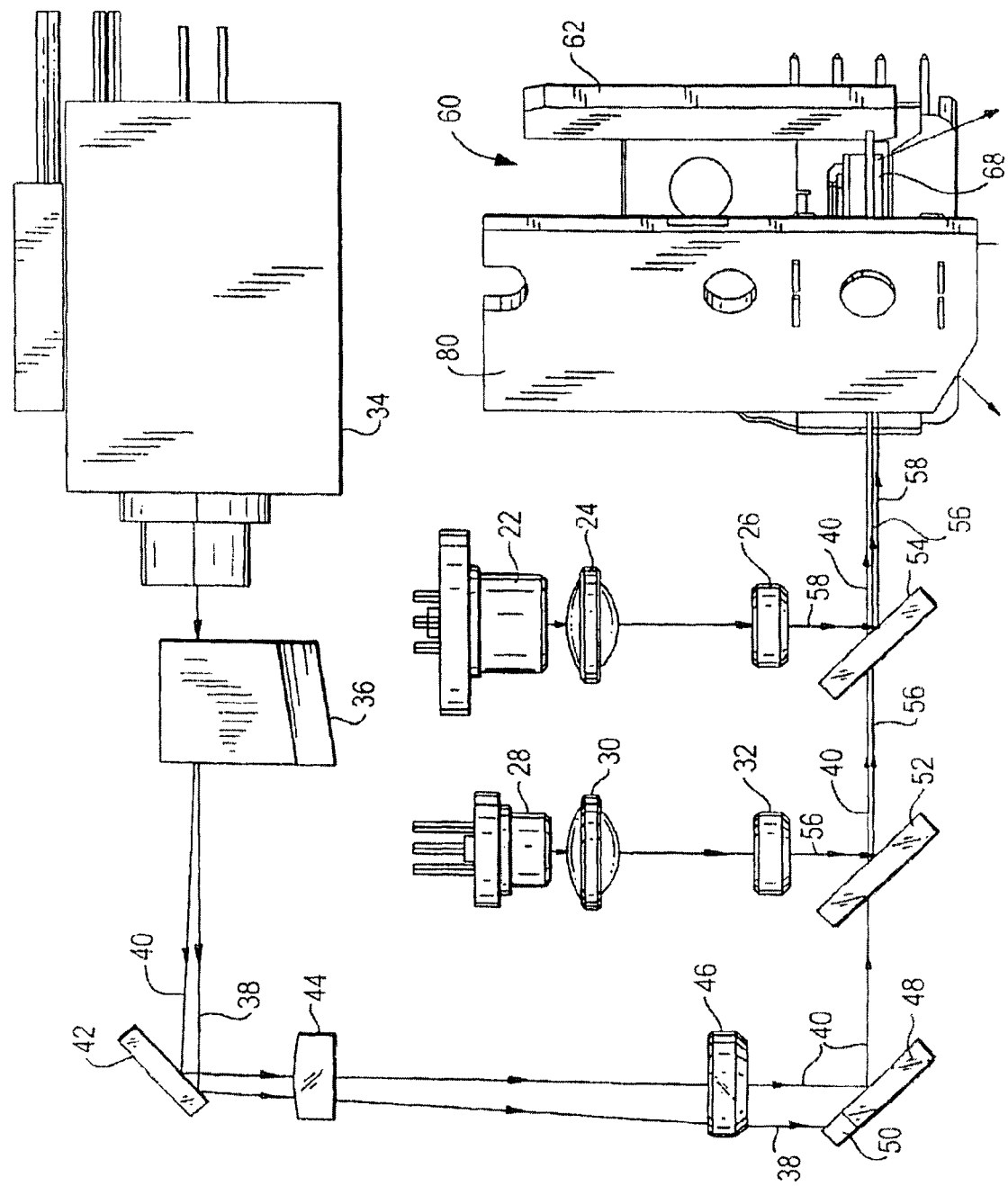
FIG. 3 is a top plan view of the arrangement of FIG. 2.

Reference numeral 10 in FIG. 1 generally identifies a hand-held instrument, for example, a personal digital assistant, in which a lightweight, compact, image projection arrangement 20, as shown in FIG. 2, is mounted and operative for projecting a two-dimensional color image on a projection surface at a variable distance from the instrument. By way of example, an image 18 is situated within a viewing range of distances relative to the instrument 10.

As shown in FIG. 1, the image 18 extends over an optical horizontal scan angle A extending along the horizontal direction, and over an optical vertical scan angle B extending along the vertical direction, of the image. As described below, the image is comprised of illuminated and non-illuminated pixels on a raster pattern of scan lines swept by a scanner in the arrangement 20.

The parallelepiped shape of the instrument 10 represents just one form factor of a housing in which the arrangement 20 may be implemented. The instrument can be shaped with many different form factors, such as a pen, a cellular telephone, a clamshell or a wristwatch.

In the preferred embodiment, the arrangement 20 measures about seventy cubic centimeters in volume. This compact, miniature size allows the arrangement 20 to be mounted in housings of many diverse shapes, large or small, portable or stationary, including some having an on-board display 12, a keypad 14, and a window 16 through which the image is projected.

Referring to FIGS. 2 and 3, the arrangement 20 includes a solid-state, preferably a semiconductor laser 22 which, when energized, emits a bright red laser beam at about 635-655 nanometers. Lens 24 is a bi-aspheric convex lens having a positive focal length and is operative for collecting virtually all the energy in the red beam and for producing a diffraction-limited beam. Lens 26 is a concave lens having a negative focal length. Lenses 24, 26 are held by non-illustrated respective lens holders apart on a support (not illustrated in FIG. 2 for clarity) inside the instrument 10. The lenses 24, 26 shape the red beam profile over the working distance.

Another solid-state, semiconductor laser 28 is mounted on the support and, when energized, emits a diffraction-limited blue laser beam at about 440 nanometers. Another bi-aspheric convex lens 30 and a concave lens 32 are employed to shape the blue beam profile in a manner analogous to lenses 24, 26.

A green laser beam having a wavelength on the order of 532 nanometers is generated not by a semiconductor laser, but instead by a green module 34 having an infrared diode-pumped, Nd-doped, YAG crystal laser whose output beam at 1064 nanometers. A non-linear frequency doubling crystal is included in the infrared laser cavity between two laser mirrors. Since the infrared laser power inside the cavity is much larger than the power coupled outside the cavity, the frequency doubler is more efficient in generating the double frequency green light inside the cavity. The output mirror of the laser is reflective to the 1064 nm infrared radiation, and transmissive to the doubled 532 nm green laser beam. Since the correct operation of the solid-state laser and frequency doubler require precise temperature control, a semiconductor device relying on the Peltier effect is used to control the temperature of the green laser module. The thermo-electric cooler can either heat or cool the device depending on the polarity of the applied current. A thermistor is part of the green laser module in order to monitor its temperature. The readout from the thermistor is fed to a controller, which adjusts the control current to the thermo-electric cooler accordingly.

As explained below, the lasers are pulsed in operation at frequencies on the order of 100 MHz. The red and blue semiconductor lasers 22, 28 can be pulsed directly via the applied drive currents at such high frequencies, but the currently available green solid-state lasers cannot. As a result, the green laser beam exiting the green module 34 is pulsed with an acousto-optical modulator (AOM) 36 that creates an acoustic traveling wave inside a crystal for diffracting the green beam. The AOM 36, however, produces a zero-order, non-diffracted beam 38 and a first-order, pulsed, diffracted beam 40. The beams 38, 40 diverge from each other and, in order to separate them to eliminate the undesirable zero-order beam 38, the beams 38, 40 are routed along a long, folded path having a folding mirror 42. Alternatively, the AOM can be used internally to the green laser module to pulse the green laser beam. Other possible ways to modulate the green laser beam include electro-absorption modulation, or a Mach-Zender interferometer. The beams 38, 40 are routed through positive and negative lenses 44, 46. However, only the diffracted green beam 40 is allowed to impinge upon, and reflect from, the folding mirror 48. The non-diffracted beam 38 may be absorbed by an absorber 50, preferably mounted on the mirror 48, or can be used for another useful function.

The arrangement includes a pair of dichroic filters 52, 54 arranged to make the green, blue and red beams as collinear as possible before reaching a scanning assembly 60. Filter 52 allows the green beam 40 to pass therethrough, but the blue beam 56 from the blue laser 28 is reflected by the interference effect. Filter 54 allows the green and blue beams 40, 56 to pass therethrough, but the red beam 58 from the red laser 22 is reflected by the interference effect.

Figure 4:
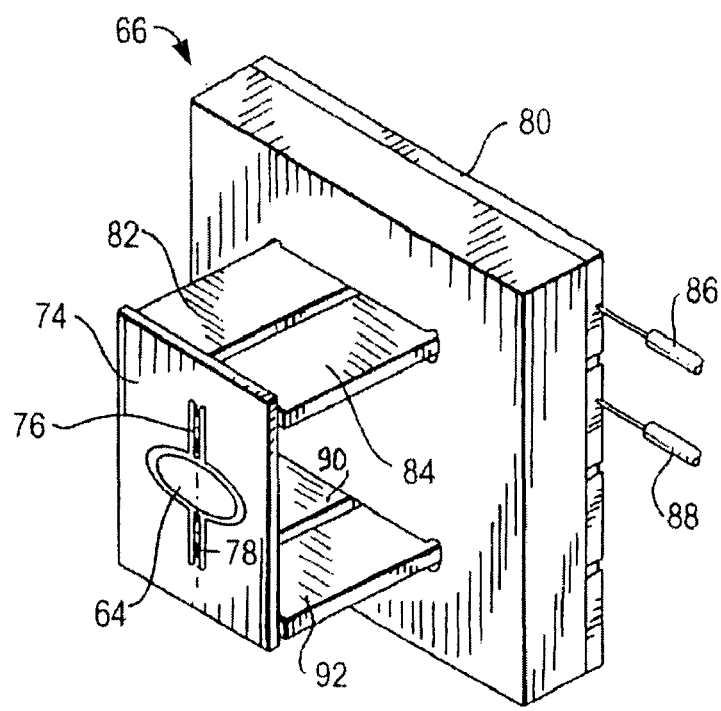
FIG. 4 is a perspective front view of an inertial drive for use in the arrangement of FIG. 2.
Figure 5:
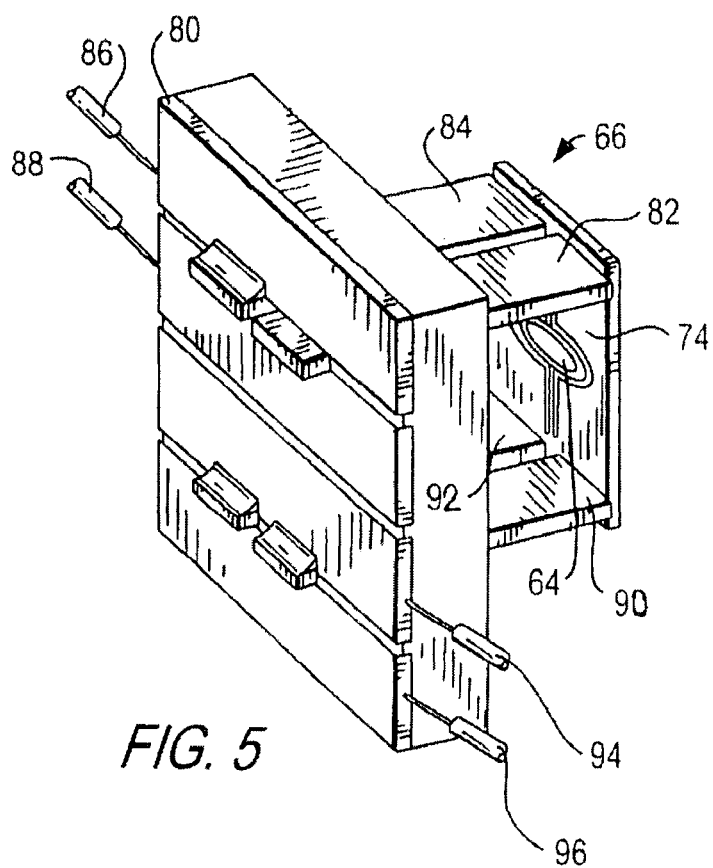
FIG. 5 is a perspective rear view of the inertial drive of FIG. 4.

The nearly collinear beams 40, 56, 58 are directed to, and reflected off, a stationary fold mirror 62. The scanning assembly 60 includes a first scan mirror 64 oscillatable by an inertial drive 66 (shown in isolation in FIGS. 4-5) at a first scan rate to sweep the laser beams reflected off the fold mirror 62 over the first horizontal scan angle A, and a second scan mirror 68 oscillatable by an electromagnetic drive 70 at a second scan rate to sweep the laser beams reflected off the first scan mirror 64 over the second vertical scan angle B. In a variant construction, the scan mirrors 64, 68 can be replaced by a single two-axis mirror.

The inertial drive 66 is a high-speed, low electrical power-consuming component. Details of the inertial drive can be found in U.S. patent application Ser. No. 10/387,878, filed Mar. 13, 2003, assigned to the same assignee as the instant application, and incorporated herein by reference thereto.

The use of the inertial drive reduces power consumption of the scanning assembly 60 to less than one watt and, in the case of projecting a color image, as described below, to less than ten watts.

The drive 66 includes a movable frame 74 for supporting the scan mirror 64 by means of a hinge that includes a pair of collinear hinge portions 76, 78 extending along a hinge axis and connected between opposite regions of the scan mirror 64 and opposite regions of the frame. The frame 74 need not surround the scan mirror 64, as shown.

The frame, hinge portions and scan mirror are fabricated of an integral, generally planar, silicon substrate, which is approximately 150 microns thick. The silicon is etched to form omega-shaped slots having upper parallel slot sections, lower parallel slot sections, and U-shaped central slot sections. The scan mirror 64 preferably has an oval shape and is free to move in the slot sections. In the preferred embodiment, the dimensions along the axes of the oval-shaped scan mirror measure 749 microns×1600 microns. Each hinge portion measures 27 microns in width and 1130 microns in length. The frame has a rectangular shape measuring 3100 microns in width and 4600 microns in length.

The inertial drive is mounted on a generally planar, printed circuit board 80 and is operative for directly moving the frame and, by inertia, for indirectly oscillating the scan mirror 64 about the hinge axis. One embodiment of the inertial drive includes a pair of piezoelectric transducers 82, 84 extending perpendicularly of the board 80 and into contact with spaced apart portions of the frame 74 at either side of hinge portion 76. An adhesive may be used to insure a permanent contact between one end of each transducer and each frame portion. The opposite end of each transducer projects out of the rear of the board 80 and is electrically connected by wires 86, 88 to a periodic alternating voltage source (not shown).

In use, the periodic signal applies a periodic drive voltage to each transducer and causes the respective transducer to alternatingly extend and contract in length. When transducer 82 extends, transducer 84 contracts, and vice versa, thereby simultaneously pushing and pulling the spaced apart frame portions and causing the frame to twist about the hinge axis. The drive voltage has a frequency corresponding to the resonant frequency of the scan mirror. The scan mirror is moved from its initial rest position until it also oscillates about the hinge axis at the resonant frequency. In a preferred embodiment, the frame and the scan mirror are about 150 microns thick, and the scan mirror has a high Q factor. A movement on the order of 1 micron by each transducer can cause oscillation of the scan mirror at scan angles in excess of 15 degrees.

Another pair of piezoelectric transducers 90, 92 extends perpendicularly of the board 80 and into permanent contact with spaced apart portions of the frame 74 at either side of hinge portion 78. Transducers 90, 92 serve as feedback devices to monitor the oscillating movement of the frame and to generate and conduct electrical feedback signals along wires 94, 96 to a feedback control circuit (not shown).

Although light can reflect off an outer surface of the scan mirror, it is desirable to coat the surface of the mirror 64 with a specular coating made of gold, silver, aluminum, or a specially designed highly reflective dielectric coating.

The electromagnetic drive 70 includes a permanent magnet jointly mounted on and behind the second scan mirror 68, and an electromagnetic coil 72 operative for generating a periodic magnetic field in response to receiving a periodic drive signal. The coil 72 is adjacent the magnet so that the periodic field magnetically interacts with the permanent field of the magnet and causes the magnet and, in turn, the second scan mirror 68 to oscillate.

The inertial drive 66 oscillates the scan mirror 64 at a high speed at a scan rate preferably greater than 5 kHz and, more particularly, on the order of 18 kHz or more. This high scan rate is at an inaudible frequency, thereby minimizing noise and vibration. The electromagnetic drive 70 oscillates the scan mirror 68 at a slower scan rate on the order of 40 Hz which is fast enough to allow the image to persist on a human eye retina without excessive flicker.

The faster mirror 64 sweeps a generally horizontal scan line, and the slower mirror 68 sweeps the generally horizontal scan line vertically, thereby creating a raster pattern which is a grid or sequence of roughly parallel scan lines from which the image is constructed. Each scan line has a number of pixels. The image resolution is preferably XGA quality of 1024×768 pixels. Over a limited working range, a high-definition television standard, denoted 720p, 1270×720 pixels, can be obtained. In some applications, a one-half VGA quality of 320×480 pixels, or one-fourth VGA quality of 320×240 pixels, is sufficient. At minimum, a resolution of 160×160 pixels is desired.

The roles of the mirrors 64, 68 could be reversed so that mirror 68 is the faster, and mirror 64 is the slower. Mirror 64 can also be designed to sweep the vertical scan line, in which event, mirror 68 would sweep the horizontal scan line. Also, the inertial drive can be used to drive the mirror 68. Indeed, either mirror can be driven by an electromechanical, electrical, mechanical, electrostatic, magnetic, or electromagnetic drive.

The slow-mirror is operated in a constant velocity sweep-mode during which time the image is displayed. During the mirror's return, the mirror is swept back into the initial position at its natural frequency, which is significantly higher. During the mirror's return trip, the lasers can be powered down in order to reduce the power consumption of the device.

Figure 6:
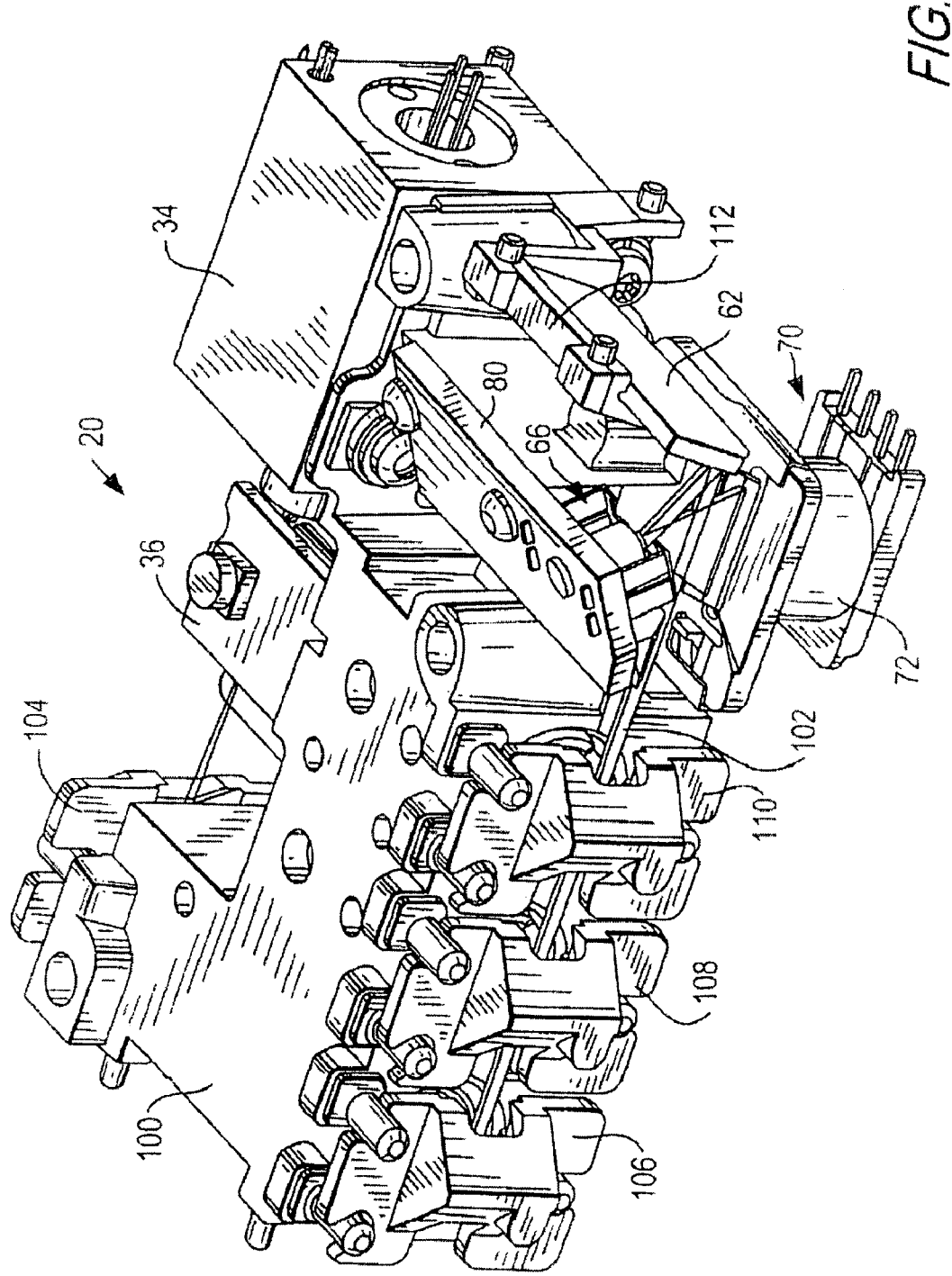
FIG. 6 is a perspective view of a practical implementation of the arrangement of FIG. 2.

FIG. 6 is a practical implementation of the arrangement 20 in the same perspective as that of FIG. 2. The aforementioned components are mounted on a support, which includes a top cover 100 and a support plate 102. Holders 104, 106, 108, 110, 112 respectively hold folding mirrors 42, 48, filters 52, 54 and fold mirror 62 in mutual alignment. Each holder has a plurality of positioning slots for receiving positioning posts stationarily mounted on the support. Thus, the mirrors and filters are correctly positioned. As shown, there are three posts, thereby permitting two angular adjustments and one lateral adjustment. Each holder can be glued in its final position.

The image is constructed by selective illumination of the pixels in one or more of the scan lines. As described below in greater detail with reference to FIG. 7, a controller 114 causes selected pixels in the raster pattern to be illuminated, and rendered visible, by the three laser beams. For example, red, blue and green power controllers 116, 118, 120 respectively conduct electrical currents to the red, blue and green lasers 22, 28, 34 to energize the latter to emit respective light beams at each selected pixel, and do not conduct electrical currents to the red, blue and green lasers to deenergize the latter to non-illuminate the other non-selected pixels. The resulting pattern of illuminated and non-illuminated pixels comprises the image, which can be any display of human- or machine-readable information or graphic.

Referring to FIG. 1, the raster pattern is shown in an enlarged view. Starting at an end point, the laser beams are swept by the inertial drive along the generally horizontal direction at the horizontal scan rate to an opposite end point to form a scan line. Thereupon, the laser beams are swept by the electromagnetic drive 70 along the vertical direction at the vertical scan rate to another end point to form a second scan line. The formation of successive scan lines proceeds in the same manner.

The image is created in the raster pattern by energizing or pulsing the lasers on and off at selected times under control of the microprocessor 114 or control circuit by operation of the power controllers 116, 118, 120. The lasers produce visible light and are turned on only when a pixel in the desired image is desired to be seen. The color of each pixel is determined by one or more of the colors of the beams. Any color in the visible light spectrum can be formed by the selective superimposition of one or more of the red, blue, and green lasers. The raster pattern is a grid made of multiple pixels on each line, and of multiple lines. The image is a bit-map of selected pixels. Every letter or number, any graphical design or logo, and even machine-readable bar code symbols, can be formed as a bit-mapped image.

Figure 7:
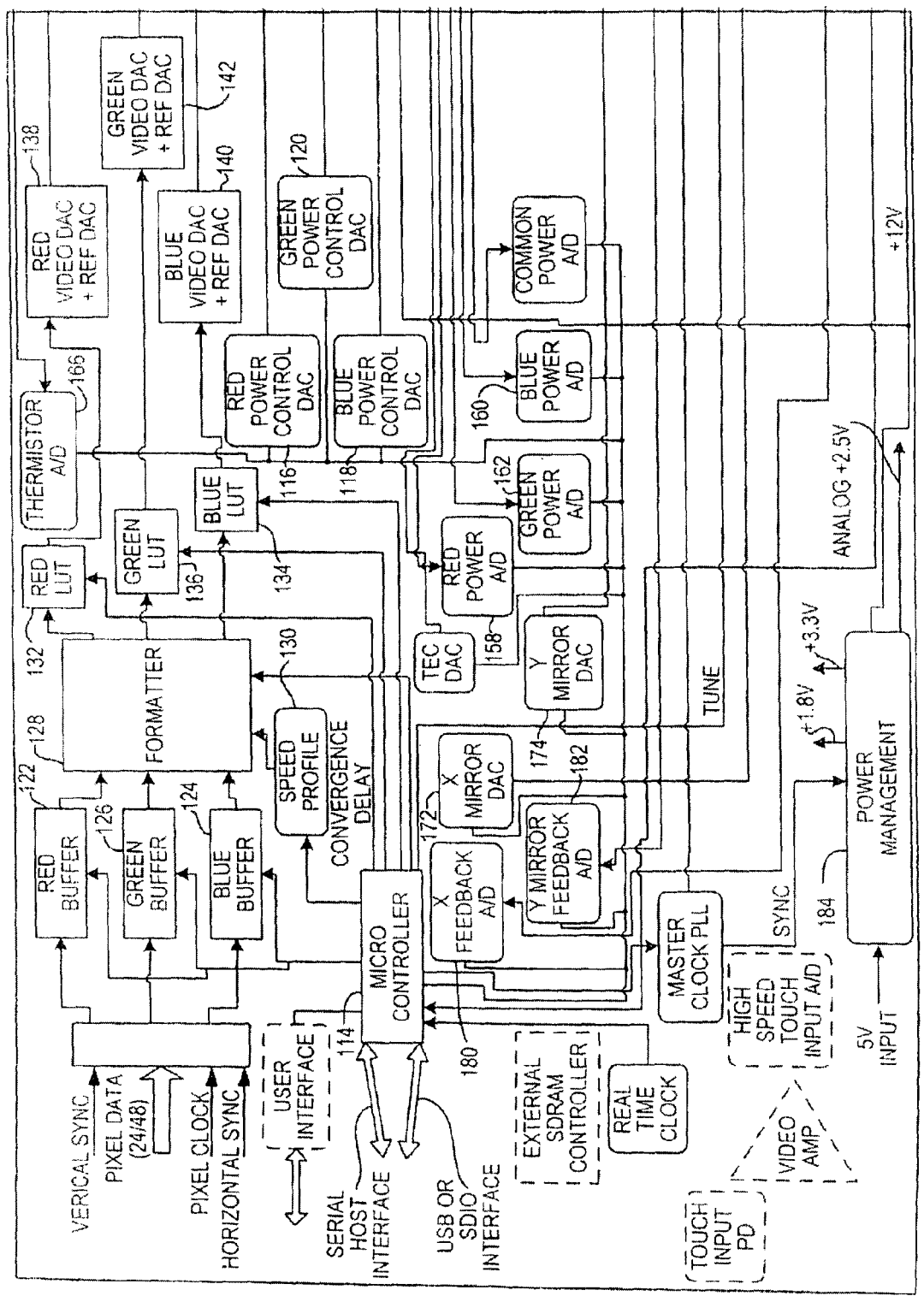
FIG. 7 is an electrical schematic block diagram depicting operation of the arrangement of FIG. 2.

As shown in FIG. 7, an incoming video signal having vertical and horizontal synchronization data, as well as pixel and clock data, is sent to red, blue and green buffers 122, 124, 126 under control of the microprocessor 114. The storage of one full VGA frame requires many kilobytes, and it would be desirable to have enough memory in the buffers for two full frames to enable one frame to be written, while another frame is being processed and projected. The buffered data is sent to a formatter 128 under control of a speed profiler 130 and to red, blue and green look up tables (LUTs) 132, 134, 136 to correct inherent internal distortions caused by scanning, as well as geometrical distortions caused by the angle of the display of the projected image. The resulting red, blue and green digital signals are converted to red, blue and green analog signals by digital to analog converters (DACs) 138, 140, 142. The red and blue analog signals are fed to red and blue laser drivers (LDs) 144, 146 which are also connected to the red and blue power controllers 116, 118. The green analog signal is fed to an acousto-optical module (AOM) radio frequency (RF) driver 150 and, in turn, to the green laser 34 which is also connected to a green LD 148 and to the green power controller 120.

Feedback controls are also shown in FIG. 7, including red, blue and green photodiode amplifiers 152, 154, 156 connected to red, blue and green analog-to-digital (A/D) converters 158, 160, 162 and, in turn, to the microprocessor 114. Heat is monitored by a thermistor amplifier 164 connected to an A/D converter 166 and, in turn, to the microprocessor.

The scan mirrors 64, 68 are driven by drivers 168, 170 which are fed analog drive signals from DACs 172, 174 which are, in turn, connected to the microprocessor. Feedback amplifiers 176, 178 detect the position of the scan mirrors 64, 68, and are connected to feedback A/Ds 180, 182 and, in turn, to the microprocessor.

A power management circuit 184 is operative to minimize power while allowing fast on-times, preferably by keeping the green laser on all the time, and by keeping the current of the red and blue lasers just below the lasing threshold.

A laser safety shut down circuit 186 is operative to shut the lasers off if either of the scan mirrors 64, 68 is detected as being outside of rated values.

As shown in FIG. 8, the drive 66 includes a permanent magnet 210 mounted on the scan mirror 64 for joint oscillation. A feedback coil 212 is positioned adjacent the magnet 210. In response to a periodic drive signal applied by the drive 66 as described above, the magnet 210 and the mirror 64 are oscillated. A feedback signal is generated by the feedback coil 212 during oscillation. A feedback circuit 176 is employed, for example, to process the zero crossings of the feedback signal to derive a start-of-scan (SOS) signal that represents mirror motion and is used to synchronize the scan lines.

However, as described above, the feedback signal can be contaminated by the periodic drive signal voltage, as well as by the switching electronics 168 of the drive 66 for producing the periodic drive signal voltage. The periodic drive signal voltage couples to the feedback coil 212 and adds to the voltage of the feedback signal. Since the contaminants are synchronous with the feedback signal, it is not readily possible to remove the contaminants by signal processing. Hence, the position of the mirror cannot be precisely located. Such contamination is a severe problem in image projectors, because the motion or velocity of the scan mirror and, hence, of each scan line swept by the scan mirror must be very highly controlled to be a constant value for both right-to-left and left-to-right scan lines. Otherwise, the projected image will be degraded.

FIGS. 9-10 illustrate the raster pattern of the combined X-mirror 64 and Y-mirror 68 motion. FIG. 9 illustrates a case where the lasers project the image when the mirror 64 moves in one direction, say from left to right and produce scans 201_i, 201_i+1, 201_i+2, etc. During these scans, the lasers project scan lines 203_i, 203_i+1, 203_i+2, etc., respectively. The laser beams are turned off during the return from right to left and produce scans 202_i, 202_i+1, 202_i+2, etc.

FIG. 10 illustrates a case where the lasers project the image during X-mirror 64 movement in both directions. During scans 301_i, 301_i+1, 301_i+2, etc., the lasers project scan lines 304_i, 304_i+1, 304_i+2, etc., respectively. During scans 302_i, 302_i+1, 302_i+2, etc., the lasers project scan lines 305_i, 305_i+1, 305_i+2, etc., respectively.

From FIGS. 9-10, it is apparent that projecting the image in both directions is advantageous because such operation results in brightness that is two times better for a given laser power. This is a big advantage. In addition, the vertical resolution is also two times better for a given scanning rate.

Also apparent from FIG. 10 is the sensitivity of the bi-directional scanning to timing error of the laser projection in respect to the X-mirror position. FIG. 10 illustrates that the scan lines projected during left-to-right scans are shifted in respect to the scan lines projected during right-to-left scans. This is because of the error in determining the mirror position and consequently determining the exact beginning of the scan line. If the scan lines are displayed only in one direction (such as in FIG. 9), such error is inconsequential because the entire image is just slightly shifted in one direction. In case of bi-directional scanning, there are two images displayed: one during left-to-right scans and the other during right-to-left scans. While each of the images is good in itself, they are shifted in respect to each other. This is highly undesirable and results in blurring of the displayed image. The tolerable limit of such shift is just a fraction of one pixel. This puts a severe burden on the accuracy of the position reading of the X-mirror.

In FIG. 10, point 303 corresponds to the exact time when the mirror 64 changes direction. This time is measured by the feedback circuit, which uses this measurement to properly modulate the laser beam. If the error in the time measurement is $e_r$, the left-to-right image is shifted in respect to the right-to-left image by $2*e_r$.

Figure 11:
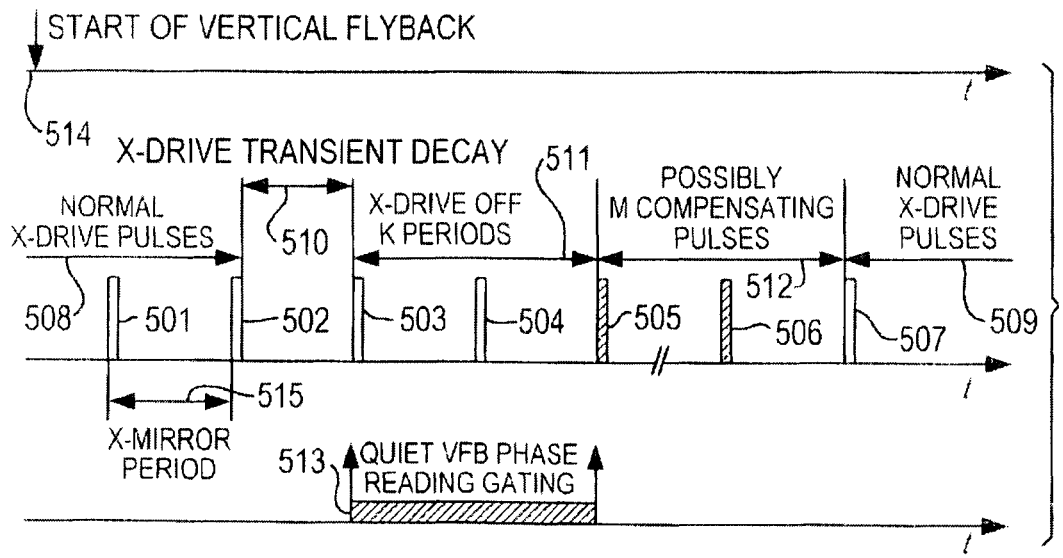
FIG. 11 is a timing circuit diagram explaining operation of the monitoring circuit according to this invention.

FIG. 11 depicts how the X-mirror position can be accurately measured by elimination of the drive voltage impact on the feedback signal. The X-mirror is driven by a periodic waveform of a train of pulses of which only pulses 501 through 507 are indicated in the drawing. The pulses are separated by intervals established by the control electronics. These intervals establish the X-mirror period.

Figure 12:
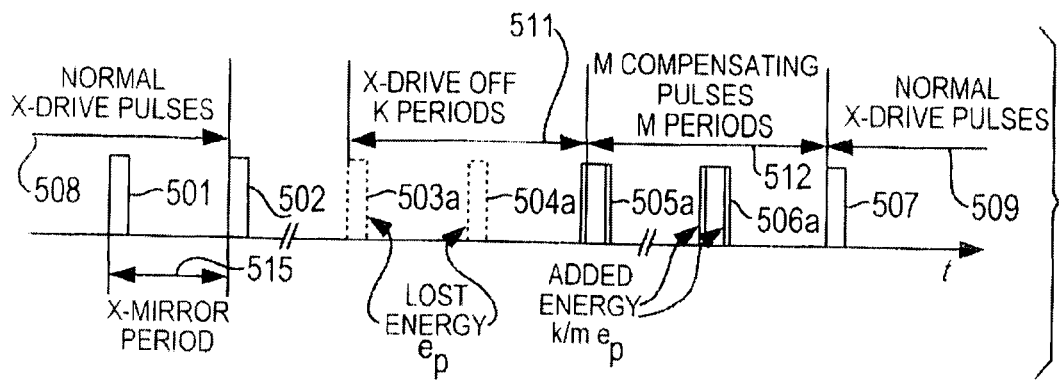
FIG. 12 is another timing circuit diagram explaining operation of the monitoring circuit according to this invention.

According to one feature of the present invention, following the period 508 of a number of normal driving pulses, some of the driving pulses are deliberately removed from the train of pulses. In FIGS. 11-12, pulses 503 and 504 are shown as removed pulses 503a and 504a in the period 511. In general, there can be k pulses removed, where k is at least one. During the quiet time 513 when the X-mirror is not driven by the pulses and after the transient period 510, the X-mirror position can be read without interference produced by the driving voltage and the switching electronics that produces it. Because the pulses are not supplied to the X-mirror and they do not have to be produced, the switching electronics can be turned off. Thus, the voltage from the velocity feedback coil 212 can be read without contamination and, consequently, with much better accuracy.

During this time, the X-mirror will oscillate at its resonance frequency due its resonant nature. Because of the relatively high Q of the X-mirror, the oscillations can last a very long time without driving voltage pulses. However, there may be accumulated phase slip of the X-mirror position in respect to the driving pulses timing if there is some frequency difference between the X-mirror resonance frequency and the frequency of the driving pulses. There will also be amplitude loss depending on the Q of the X-mirror. If the driving pulses resume, the mirror phase and amplitude will be asymptotically corrected; however, it may take a long time for the correction.

For this reason, it is advantageous to introduce several compensating pulses 505 and 506 during a compensating period 512. In that period each pulse has more energy than normally required to sustain X-mirror oscillation of the desired amplitude. In general, there can be m compensating pulses, where m is from 0 to a large number, which is a design choice. After the compensating period, normal pulses 507, etc., are resumed in the following period 509. Advantageously, the entire measurement and the compensating pulses are completed during the time of the vertical blanking interval during which the laser beam is turned off and the image is not displayed.

FIG. 12 illustrates more details of the compensating pulses. The energy lost due to removal of the pulses 503a and 504a, etc., is added back and spread in the following pulses by increasing the energy of the pulses 505a and 506a, etc. The spreading may be uniform or non-uniform. A more refined method may use overdriving (first adding more energy than was lost, and then subtracting the difference). This would even more speed up the recovery. For the best results, flexibility of "padding" the X-drive compensating pulses on one side or both sides should be provided. This would ensure that the pulse center position does not change.

It will be understood that each of the elements described above, or two or more together, also may find a useful application in other types of constructions differing from the types described above.

While the invention has been illustrated and described as embodied in an arrangement for and method of monitoring scan mirror motion, especially for image projection arrangements, it is not intended to be limited to the details shown, and can equally well apply to electro-optical readers, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A system in a light scanning arrangement having a drive coil driven by a drive signal to oscillate a scan mirror and a light beam reflected from the scan mirror, and a feedback coil for generating a feedback signal during oscillation of the scan mirror, the feedback coil being in proximity with the drive coil and being subject to corruption by cross-coupling between the coils, the system comprising:
    a drive for driving the drive coil with a drive signal formed as a periodic train of drive pulses, and for not driving the drive coil with at least one drive pulse during a quiet time period;
    circuitry for minimizing the cross-coupling by generating the feedback signal only during the quiet time period;
    a controller for monitoring a position of the scan mirror by processing the feedback signal which was generated only during the quiet time period; and
    circuitry for compensating for the absence of the at least one drive pulse in the quiet time period by generating at least one compensating pulse during a compensation time period following the quiet time period.

2. The system of claim 1, wherein the drive has a permanent magnet mounted on the scan mirror for joint oscillation therewith, and wherein the drive signal generates in the drive coil an electromagnetic field which interacts with a permanent magnetic field of the magnet to oscillate the scan mirror and the magnet at a drive frequency.

3. The system of claim 2, wherein the feedback signal has a feedback frequency corresponding to the drive frequency of the drive signal.

4. The system of claim 1, wherein the drive drives the scan mirror in only one circumferential direction.

5. The system of claim 1, wherein the drive drives the scan mirror in both opposite circumferential directions.

6. The system of claim 1, wherein the drive does not drive the drive coil for a plurality of drive pulses.

7. The system of claim 1, wherein the at least one compensating pulse has a greater pulse width than that of each drive pulse.

8. The system of claim 1, wherein the controller processes the feedback signal by measuring the position of the scan mirror during the quiet time period.

9. A method performed in a light scanning arrangement having a drive coil driven by a drive signal to oscillate a scan mirror and a light beam reflected from the scan mirror, and a feedback coil for generating a feedback signal during oscillation of the scan mirror, the feedback coil being in proximity with the drive coil and being subject to corruption by cross-coupling between the coils, the method comprising the steps of:
    driving the drive coil with a drive signal formed as a periodic train of drive pulses, and not driving the drive coil with at least one drive pulse during a quiet time period;
    minimizing the cross-coupling by generating the feedback signal only during the quiet time period;
    monitoring a position of the scan mirror by processing the feedback signal which was generated only during the quiet time period; and
    compensating for the absence of the at least one drive pulse in the quiet time period by generating at least one compensating pulse during a compensation time period following the quiet time period.

10. The method of claim 9, and mounting a permanent magnet on the scan mirror for joint oscillation therewith, and generating in the drive coil an electromagnetic field which interacts with a permanent magnetic field of the magnet to oscillate the scan mirror and the magnet at a drive frequency.

11. The method of claim 10, wherein the feedback signal has a feedback frequency corresponding to the drive frequency of the drive signal.

12. The method of claim 9, wherein the driving step is performed by driving the scan mirror in only one circumferential direction.

13. The method of claim 9, wherein the driving step is performed by driving the scan mirror in both opposite circumferential directions.

14. The method of claim 9, wherein the driving step is performed by not driving the drive coil for a plurality of drive pulses.

15. The method of claim 9, wherein the at least one compensating pulse has a greater pulse width than that of each drive pulse.

16. The method of claim 9, wherein the processing of the feedback signal is performed by measuring the position of the scan mirror during the quiet time period.

17. A system in a light scanning arrangement having a drive coil driven by a drive signal to oscillate a scan mirror and a light beam reflected from the scan mirror, and a feedback coil for generating a feedback signal during oscillation of the scan mirror, the feedback coil being in proximity with the drive coil and being subject to corruption by cross-coupling between the coils, the system comprising:
    means for driving the drive coil with a drive signal formed as a periodic train of drive pulses, and for not driving the drive coil with at least one drive pulse during a quiet time period;
    means for minimizing the cross-coupling by generating the feedback signal only during the quiet time period;
    means for monitoring a position of the scan mirror by processing the feedback signal which was generated only during the quiet time period; and
    means for compensating for the absence of the at least one drive pulse in the quiet time period by generating at least one compensating pulse during a compensation time period following the quiet time period.

18. An image projection arrangement for projecting an image on a projection surface, comprising:
    a light source for generating a laser beam;
    a scanner for sweeping the laser beam along mutually orthogonal scan directions to project a pattern of scan lines on the projection surface, each scan line having a number of pixels, the scanner including a drive coil, and an oscillatable scan mirror from which the laser beam is reflected;
    a drive for driving the drive coil with a drive signal formed as a periodic train of drive pulses to oscillate the scan mirror, and for not driving the drive coil with at least one drive pulse during a quiet time period;
    a feedback coil for generating a feedback signal during oscillation of the scan mirror, the feedback coil being in proximity with the drive coil and being subject to corruption by cross-coupling between the coils;
    circuitry for minimizing the cross-coupling by generating the feedback signal only during the quiet time period;
    a controller for monitoring a position of the scan mirror by processing the feedback signal which was generated only during the quiet time period, the controller also being operatively connected to the scanner and the light source, for causing selected pixels to be illuminated, and rendered visible, to produce the image; and circuitry for compensating for the absence of the at least one drive pulse in the quiet time period by generating at least one compensating pulse during a compensation time period following the quiet time period.

19. The image projection arrangement of claim 18, wherein the light source includes red, blue and green lasers for respectively emitting red, blue and green laser beams to form the laser beam as a composite laser beam to produce the image in color.

20. The image projection arrangement of claim 19, wherein each of the red and blue lasers is an edge-emitting semiconductor laser.

21. The image projection arrangement of claim 19, wherein the green laser includes a diode-pumped, solid-state laser with an optical frequency doubler to produce the green beam.

22. The image projection arrangement of claim 18, wherein the scan mirror is oscillated at its mechanical resonant frequency to minimize power consumption.

23. The image projection arrangement of claim 18, wherein the controller includes means for energizing the light source to illuminate the selected pixels, and for deenergizing the light source to non-illuminate pixels other than the selected pixels.

24. The image projection arrangement of claim 18, wherein the drive has a permanent magnet mounted on the scan mirror for joint oscillation therewith, and wherein the drive signal generates in the drive coil an electromagnetic field which interacts with a permanent magnetic field of the magnet to oscillate the scan mirror and the magnet at a drive frequency.

25. The image projection arrangement of claim 24, wherein the feedback signal has a feedback frequency corresponding to the drive frequency of the drive signal.

26. The image projection arrangement of claim 18, wherein the drive drives the scan mirror in only one circumferential direction.

27. The image projection arrangement of claim 18, wherein the drive drives the scan mirror in both opposite circumferential directions.

28. The image projection arrangement of claim 18, wherein the drive does not drive the drive coil for a plurality of drive pulses.

29. The image projection arrangement of claim 18, wherein the at least one compensating pulse has a greater pulse width than that of each drive pulse.

30. The image projection arrangement of claim 18, wherein the controller processes the feedback signal by measuring the position of the scan mirror during the quiet time period.

31. The image projection arrangement of claim 18, wherein the controller produces the image during frame intervals separated by blanking intervals, and wherein the quiet time period occurs during a blanking interval.

32. A method of projecting an image on a projection surface, comprising the steps of:

generating a laser beam;

sweeping the laser beam along mutually orthogonal scan directions to project a pattern of scan lines on the projection surface, each scan line having a number of pixels, the sweeping being performed by a drive coil, and an oscillatable scan mirror from which the laser beam is reflected;

driving the drive coil with a drive signal formed as a periodic train of drive pulses to oscillate the scan mirror, and not driving the drive coil with at least one drive pulse during a quiet time period;

generating a feedback signal in a feedback coil during oscillation of the scan mirror, the feedback coil being in proximity with the drive coil and being subject to corruption by cross-coupling between the coils;

minimizing the cross-coupling by generating the feedback signal only during the quiet time period;

monitoring a position of the scan mirror by processing the feedback signal which was generated only during the quiet time period;

compensating for the absence of the at least one drive pulse in the quiet time period by generating at least one compensating pulse during a compensation time period following the quiet time period; and causing selected pixels to be illuminated, and rendered visible, to produce the image.

33. The method of claim 32, wherein the laser beam is generated as a composite beam from red, blue and green lasers for respectively emitting red, blue and green laser beams to produce the image in color.

34. The method of claim 33, wherein each of the red and blue lasers is an edge-emitting semiconductor laser.

35. The method of claim 32, wherein the green laser includes a diode-pumped, solid-state laser with an optical frequency doubler to produce the green beam.

36. The method of claim 32, and oscillating the scan mirror at its mechanical resonant frequency to minimize power consumption.

37. The method of claim 32, and energizing a light source to illuminate the selected pixels, and deenergizing the light source to non-illuminate pixels other than the selected pixels.

38. The method of claim 32, and mounting a permanent magnet on the scan mirror for joint oscillation therewith, and generating in the drive coil an electromagnetic field which interacts with a permanent magnetic field of the magnet to oscillate the scan mirror and the magnet at a drive frequency.

39. The method of claim 38, wherein the feedback signal has a feedback frequency corresponding to the drive frequency of the drive signal.

40. The method of claim 32, wherein the driving step is performed by driving the scan mirror in only one circumferential direction.

41. The method of claim 32, wherein the driving step is performed by driving the scan mirror in both opposite circumferential directions.

42. The method of claim 32, wherein the driving step is performed by not driving the drive coil for a plurality of drive pulses.

43. The method of claim 32, wherein the at least one compensating pulse has a greater pulse width than that of each drive pulse.

44. The method of claim 32, wherein the processing of the feedback signal is performed by measuring the position of the scan mirror during the quiet time period.

45. The method of claim 32, and producing the image during frame intervals separated by blanking intervals, and wherein the quiet time period occurs during a blanking interval.

46. An image projection arrangement for projecting an image on a projection surface, comprising:

means for generating a laser beam;

means for sweeping the laser beam along mutually orthogonal scan directions to project a pattern of scan lines on the projection surface, each scan line having a number of pixels, the sweeping means including a drive coil means, and an oscillatable scan mirror means from which the laser beam is reflected;

means for driving the drive coil means with a drive signal formed as a periodic train of drive pulses to oscillate the scan mirror means, and for not driving the drive coil with at least one drive pulse during a quiet time period;

feedback coil means for generating a feedback signal during oscillation of the scan mirror means, the feedback coil means being in proximity with the drive coil means and being subject to corruption by cross-coupling between the two coil means;

means for minimizing the cross-coupling by generating the feedback signal only during the quiet time period;

means for compensating for the absence of the at least one drive pulse in the quiet time period by generating at least one compensating pulse during a compensation time period following the quiet time period; and control means for monitoring a position of the scan mirror means by processing the feedback signal which was generated only during the quiet time period, the control means also being operative for causing selected pixels to be illuminated, and rendered visible, to produce the image.

* * * * *